US007653700B1

(12) United States Patent
Bahl et al.

(10) Patent No.: US 7,653,700 B1
(45) Date of Patent: Jan. 26, 2010

(54) SYSTEM AND METHOD FOR PERFORMING CLIENT-CENTRIC LOAD BALANCING OF MULTIPLE GLOBALLY-DISPERSED SERVERS

(75) Inventors: Pradeep Bahl, Redmond, WA (US); Feng Sun, Issaquah, WA (US); Bernard D. Aboda, Bellevue, WA (US); Arnold S. Miller, Alexandria, VA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 09/714,406

(22) Filed: Nov. 16, 2000

(51) Int. Cl.
*G06F 15/16* (2006.01)
(52) U.S. Cl. ................... 709/217; 709/216; 709/226; 709/227; 709/219
(58) Field of Classification Search ............. 709/227, 709/232, 216, 217, 219, 226, 229; 718/105, 718/104
See application file for complete search history.

(56) References Cited

U.S. PATENT DOCUMENTS

| 6,108,703 | A | * | 8/2000 | Leighton et al. ............ 709/226 |
| 6,115,745 | A | * | 9/2000 | Berstis et al. ............... 709/227 |
| 6,671,259 | B1 | * | 12/2003 | He et al. ..................... 370/238 |
| 2001/0049741 | A1 | * | 12/2001 | Skene et al. ................ 709/232 |
| 2004/0162901 | A1 | * | 8/2004 | Mangipudi et al. ......... 709/225 |
| 2005/0022203 | A1 | * | 1/2005 | Zisapel et al. .............. 718/105 |

FOREIGN PATENT DOCUMENTS

EP 0 817 444 A2 1/1998

WO WO 00/14636 3/2000

OTHER PUBLICATIONS

Load Distribution for scalable Web servers: Summer Olympics 1996—A case study by German Goldszmidt and Andy Stanford—Clark IBm Watson Research center.*
Downey, Allen B., *Using pathchar to estimate Internet link characteristics*, Colby College, Waterville, Maine, Aug. 1999, 6 pages.
Mah, Bruce A., *Pchar: Child of Pathchar*, Security and Networking Research Department (8910), Sandia National Laboratories, California, Jul. 21, 1999, 4 pages.

(Continued)

*Primary Examiner*—William C Vaughn, Jr.
*Assistant Examiner*—Djenane M Bayard

(57) ABSTRACT

Presented is a system and a method for load balancing multiple globally-dispersed servers based on client-centric performance criteria. The infrastructure of the system includes load balancing domain name servers (DNS-LBs) deployed in close physical proximity to the Internet service providers' points of presence. The DNS-LBs are then able to monitor the performance of the servers from a location close to the clients, which allows the DNS-LBs to select a server that will yield the best performance from that location for the client. A second level of the infrastructure utilizes domain name servers (DNS-Bs) that are deployed on the Internet backbones and regional provides. The authoritative domain name servers (DNS-As) for the servers to be load balanced refer all name queries to these DNS-Bs. The DNS-Bs then refer the queries to one of the DNS-LBs based on a mapping of the DNS-ISP address to its physically proximate DNS-LB. The DNS-LB then returns the IP address of the server that will provide the best performance from that location.

17 Claims, 3 Drawing Sheets

OTHER PUBLICATIONS

Amin Vahdat (Duke University), Michael Dahlin (University of Texas, Austin), Thomas Anderson and Amit Aggarwal (University of Washington), *Active Names: Flexible Location and Transport of Wide-Area Resources*, Departments of Computer Science and Engineering, 12 pages.

Amin Vahdat (University of California at Berkeley), Thomas Anderson (University of Washington at Seattle), Michael Dahlin (University of Texas at Austin), Eshwar Belani, David Culler, Paul Eastham, and Chad Yoshikawa (University of California at Berkeley), *WebOS: Operating System Services for Wide Area Applications*, Departments of Computer Science and Engineering, 12 pages.

Andy Myers, Peter Dinda, and Hui Zhang, *Performance Characteristics of Mirror Servers on the Internet*, Carnegie Mellon University, Pittsburgh, Pennsylvania, 10 pages.

Samrat Bhattacharjee, Mostafa H. Ammar, Ellen W. Zegura, Viren Shah, and Zongming Fei, *Application-Layer Anycasting*, Networking and Telecommunications Group, College of Computing, Georgia Institute of Technology, Atlanta, Georgia, 9 pages.

Zongming Fei, Samrat Bhattacharjee, Ellen W. Zegura, and Mostafa H. Ammar, *A Novel Server Selection Technique for Improving the Response Time of a Replicated Service*, Networking and Telecommunications Group, College of Computing, Georgia Institute of Technology, Atlanta, Georgia, 9 pages.

Chad Yoshikawa, Brent Chun, Paul Eastham, Amin Vahdat, Thomas Anderson, and David Culler, *Using Smart Clients to Build Scalable Services*, Computer Science Division, University of California at Berkeley, 13 pages.

James D. Guyton and Michael F. Schwartz, *Locating Nearby Copies of Replicated Internet Servers*, Department of Computer Science, University of Colorado at Boulder, Feb. 1995, 11 pages.

Parvathi Chundi, Ragini Narasimhan, Daniel J. Rosenkrantz, and S.S. Ravi, *Active Client Primary-Backup Protocols (Brief Announcement)*, Department of Computer Science, University of Albany—State University of New York, 1 page.

Kevin Lai and Mary Baker, *Measuring Link Bandwidths Using a Deterministic Model of Packet Delay*, Stanford University, 12 pages.

Networkers 2000, *Intelligent Server Load Balancing in IBM 390 Environments: A Cisco/IBM Alliance Case Study Session 2700*, Cisco Systems, Inc. (2000), at cisco.com.

Networkers 2000, *Deploying Server Load Balancing Technology Session 2800*, Cisco Systems, Inc. (2000), at cisco.com.

Kevin Delgadillo, *Cisco DistributedDirector*, Cisco Systems, Inc. (1999), 19 pages.

*FreeFlow—The Standard For Global Internet Content and Applications Delivery (High-performance Internet content delivery)*, Akamai Technologies, Inc. (Jun. 2000), Cambridge, Massachusetts, 2 pages, visit at www.akamai.com.

*Global Traffic Management: Increase Web site performance with FirstPoint*, Akamai Technologies, Inc. (1999-2000), http://www.akamai.com/html/sv/gltr.html.

*FirstPoint Benefits*, Akamai Technologies, Inc. (1999-2000), at http://www.akamai.com/html/sv/gltr_fpbenefits.html.

*How FirstPoint Works*, Akamai Technologies, Inc. (1999-2000) at http://www.akamai.com/html/sv/gltr_fphow.html.

*Value Added Services*, Akamai Technologies, Inc. (1999-2000) at http://www.akamai.com/html/sv/gltr_fpvalue.html.

*Akamai FirstPoint: The Unique Global Traffic Management Service*, Akamai Technologies, Inc. (Jun. 2000), Cambridge, Massachusetts, 2 pages, visit at www.akamai.com.

Product Brochure, F5 Networks, Inc. (2000), Seattle, Washington, 8 pages, visit at www.f5.com.

Gregory Yerxa, *Firewall & Load-Balancer: Perfect Union?*, Network Computing (Feb. 7, 2000) 84, 4 pages.

Gregory Yerxa, *Sharing the Load Across the Web*, Network Computing (Dec. 13, 1999), 54, 4 pages.

Gregory Yerxa, *F5 Networks, RadWare Lead the Pack*, Network Computing (Dec. 13, 1999), 62, 6 pages.

Pankaj Chowdhry, *Alteon Saves Loads of Time*, PC Week (Dec. 14, 1998), 15, 50, 143(1), 3 pages.

Sarah L. Roberts-Witt, *Balancing Web Traffic Gets Dicier*, Internet World (Nov. 16, 1998), 27(1), 3 pages.

Loring Wirbel, *Alteon, 3Com emphasize control of flows across stack—New strategies devised for server load balancing*, Electronic Engineering Times (Jan. 11, 1999), n1043, 40, 3 pages.

U.S. Appl. No. 11/063,140.
U.S. Appl. No. 10/715,170.
U.S. Appl. No. 10/657,412.
U.S. Appl. No. 11/106,080.
U.S. Appl. No. 11/178,014.
U.S. Appl. No. 11/453,778.
U.S. Appl. No. 11/680,477.
U.S. Appl. No. 11/768,083.
U.S. Appl. No. 11/865,914.
U.S. Appl. No. 11/862,778.
U.S. Appl. No. 11/865,988.
U.S. Appl. No. 12/189,438.
U.S. Appl. No. 12/072,936.
European Patent Office Communication, Sep. 8, 2004.
European Patent Office Summons to attend oral proceeding, Feb. 5, 2008.

\* cited by examiner

| DNS-ISP-Address | DNS-LB-Address |
|---|---|
| DNS-ISP1-A | DNS-LB1-A |
| DNS-ISP2-A | DNS-LB2-A |
| DNS-ISP3-A | DNS-LB3-A |
| ... | ... |
| DNS-ISPN-1-A | DNS-LBN-1-A |
| DNS-ISPN-A | DNS-LBN-A |

SYSTEM AND METHOD FOR PERFORMING CLIENT-CENTRIC LOAD BALANCING OF MULTIPLE GLOBALLY-DISPERSED SERVERS

TECHNICAL FIELD

This invention relates generally to systems and methods for performing server load balancing across multiple globally dispersed web servers, and more particularly relates to systems and methods for performing such global load balancing based on client-centric parameters such as physical proximity, server availability, network latency, etc.

BACKGROUND OF THE INVENTION

While the Internet began in the late 1960's as a experimental wide-area computer network connecting only important research organizations in the U.S., the advent of the TCP/IP (Transmission Control Protocol/Internet Protocol) protocol suite in the early 1980's fueled the rapid expansion of this network from a handful of hosts to a network of tens of thousands of hosts. This expansion has continued at an accelerating pace, and resulted in the mid-1990's in the transition of the Internet to the use of multiple commercial backbones connecting millions of hosts around the world. These new commercial backbones carry a volume of over 600 megabits per second (over ten thousand times the bandwidth of the original ARPanet). This rapid expansion now enables tens of millions of people to connect to the Internet for communication, collaboration, the conduction of business and consumer sales, etc. This new economy enabled by the modern Internet serves a global community of users and businesses without borders and without time constraints common in the brick-and-mortar economy.

While it may have originally been possible to host a company's Web site on a single server machine, the shear volume of users on the Internet virtually precludes such single server hosting in a manner that allows reliable and timely e-commerce to be conducted thereon. Specifically, the number of requests that may be handled per second by a single server is limited by the physical capabilities of that server. As the number increases, the server performance and response time to each individual request declines, possibly to a point where additional requests are denied service by the server that has reached its connection servicing limit. As further connections are attempted, server failure may occur. To overcome this problem, many hosts have implemented multiple-server clusters for the hosting of the business' Websites to increase the volume and performance seen by clients while visiting these Websites. To ensure that no single server machine within a host cluster becomes overloaded, modern host clusters utilize server load balancing mechanisms to ensure distribution of the client load between the available server machines.

While such a cluster architecture greatly improves a host's ability to serve an increasing number of clients, hosting a Web site at a single physical location, regardless of the number of server machines at that location, still suffers from network latencies caused by the globally dispersed distribution of the clients who may connect to that single physical location from any point on the globe. Further, reliance on a single physical location for the hosting of an entire enterprise's Website subjects that enterprise to the possibility of failure of its ability to serve any clients if a failure at that site occurs. Such failures include long-term power outages, natural disasters, network outages, etc.

To provide redundancy of operation, to minimize the risk of an entire enterprise's presence on the Internet being lost, and to decrease network latencies caused by long-distance communication from globally dispersed clients, many enterprises have begun to utilize multiple, globally dispersed servers to host mirrored Websites at different points around the globe. These multiple web servers typically host an enterprise's Web site having identical content with all of the other globally dispersed servers, and are typically accessed via the same domain name. In this way, the probability of any single client located anywhere in the world of successfully reaching and being served by an enterprise's web server is greatly enhanced, regardless of failure or overloading at any one server location.

Since multiple physical servers positioned at globally dispersed locations are accessible via an identical domain name, a mechanism is required to correctly resolve the domain name to an individual IP address to enable a client to connect and be served by a single web server. A simplistic method for returning only a single IP address to any particular client enabled by a Domain Name Server (DNS) that is authoritative for that domain name is known as a round robin system. In operation, the authoritative DNS simply returns one of the lists of available IP addresses upon query from the client's name server. Upon the next inquiry from a client name server, the authoritative DNS returns the next IP address in its list of available IP addresses. This mechanism continues until all of the available IP addresses have been provided in response to successive queries, at which point the authoritative DNS repeats from the top of the list.

While such a round robin scheme distributes the client traffic among the various servers, it does so without regard to server availability, capacity, physical proximity to the client, network latency, etc. As a result, it is possible for a client located in the same physical proximity with an enterprise's web server to be directed to a mirrored web server for that enterprise physically located thousands of miles away in another country and having a much smaller capacity and, therefore, a greatly increased network latency than the server at the client's proximate location.

Recognizing the limitations of the DNS-based round robin mechanism, several companies have introduced global load sharing products that purport to provide a more performance-based mechanism for returning an IP address for a server that will yield better performance than the round robin approach provided by DNS. One such system redirects end user service requests to the closest server as determined by client-to-server proximity and/or client-to-server link latency (round-trip times) to achieve increased access performance and reduced transmission costs. Unfortunately, such systems are typically employed at a single server site for the enterprise. As such, the monitoring of actual network latencies for any particular client to any particular server site location is not possible. Instead, such systems typically simulate client traffic to the distributed servers to determine network latencies. Alternatively, such systems employ physical proximity between a client's location and a particular web server's location as the primary determining factor in returning that server's IP address to the client. Unfortunately physical proximity alone may not have much bearing on the best performing web site for a particular client's location. As such, such systems cannot guarantee optimum performance from any particular client's location. There are systems that deploy load balancing agents at the various sites of the enterprise (not just one site) and figure out the latency to the client from each of these sites to determine the best one. This scheme, however, does not simulate the real-life situation of a client going to a server as accurately as can be done from a location close to the client.

As an alternative to performing some type of load balancing across multiple enterprise servers, other systems provide local caching of Web site content for access by physically proximate clients. Such systems change the web page content of their client enterprises by changing the uniform resource locators (URLs) in it to point to the domain of the local cached content. In this system, name queries for the enterprise domain are handled by separate DNS servers for the cached content system. Unfortunately, such systems remove content control, at least for a short period of time, from the enterprise itself as its content is cached on the localized system. Indeed, such localized caching of Website content duplicates the services provided by the globally dispersed servers employed by the enterprise to ensure reliable performance to its clients.

There exists, therefore, a need in the art for a system of global load balancing for globally dispersed servers that overcomes these and other known problems existing in the art.

SUMMARY OF THE INVENTION

The inventive concepts of the instant invention involve a mechanism and infrastructure for performing global load balancing across a plurality of globally dispersed Websites of a customer from a location close to the client.

As discussed above, to increase system robustness and to reduce network latencies resulting from servicing clients over large physical distances many companies have begun utilizing multiple Web servers located throughout the country, and indeed throughout different locations worldwide. In order to provide the best possible client experience, the connection loads need to be balanced across these multiple sites based on server load/availability, physical client proximity, network latency between the client and server, network costs, etc. While several companies have developed mechanisms to provide some form of global load balancing, none of these current systems measure actual network latency from physical locations close to the various clients. As a result, a particular client may be directed to a particular web server when, in fact, a different web server may have smaller latencies and give better performance from the client's physical location.

The system and infrastructure of the instant invention overcome this problem by performing global load balancing from physical locations in close proximity to the actual client. This system of Distributed Global Load Balancing (DGLB) includes a DNS with a load balancer component (DNS-LB) located at or in close physical proximity to every Internet service provider (ISP) POP. This DNS-LB is also preferably a client of the ISP, and therefore is configured with the addresses of the ISPs DNS (DNS-ISP). These DNS-LBs form the first level of the DGLB DNS hierarchy. This first level exists in close proximity to the clients, and comprises potentially tens of hundreds or thousands of DNS-LBs to properly globally load balance all client locations. At a second level of the DGLB DNS hierarchy, a set of DNS servers (DNS-B) are deployed on the backbones or on regional providers (National/Regional backbones, Internet exchange points). These will be typically few (likely to be in single digits or low tens).

In operation, the DNS-LBs maintain current knowledge of the ISP's DNS address, and periodically notify the DNS-B machines about the addresses of the DNS-ISP servers. These regionally located DNS-B servers maintain a mapping of the DNS-ISP addresses to their corresponding DNS-LB addresses so that the DNS-Bs may direct requests to the proper, proximately located DNS-LB. This proper DNS-LB provides the required address information for the best Web server (or ordered list of addresses from best to worst) to the DNS-ISP. This DNS-ISP will cache the address information for the appropriate authoritative Website as determined by the DNS-LB for that particular client. This address is then provided to the client who will then direct its traffic to that site.

In an alternate embodiment of the invention, the DNS-LB also performs the function of a caching engine. In this embodiment, the DNS-B responds to the name query by giving the address of the DNS-LB corresponding to the DNS-ISP that sent the request through the referral process described above. When the address information is provided to the client, it sends its HTTP request to the DNS-LB who then acts as a proxy cache for the request. The DNS-LB is smart enough to retrieve the cacheable content from either the closest Website or another closer proxy server that has the content required. This mechanism provides high performance for client requests in a manner that is totally oblivious to the ISPs.

In a further alternate embodiment of the invention, the DNS-LBs also provide information about the best site (or ordered list) to DNS-Bs that can then respond to the name query by providing the address of the best site or the addresses of the sites ordered from best to worst. In this embodiment the DNS-LBs act as measurement services near the client (using various measured values to determine the best site based on policy) communicating their results to the DNS-Bs.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
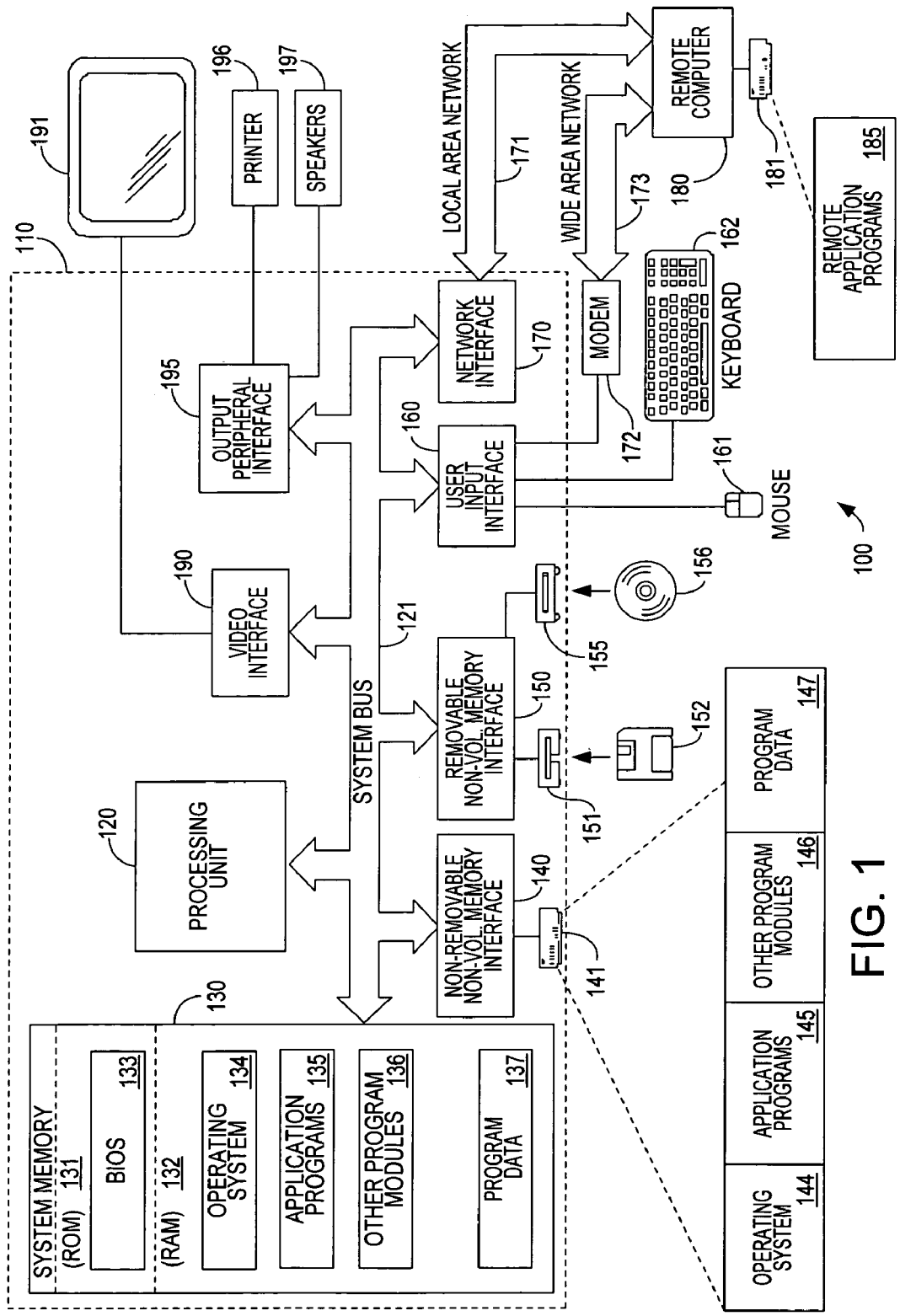
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
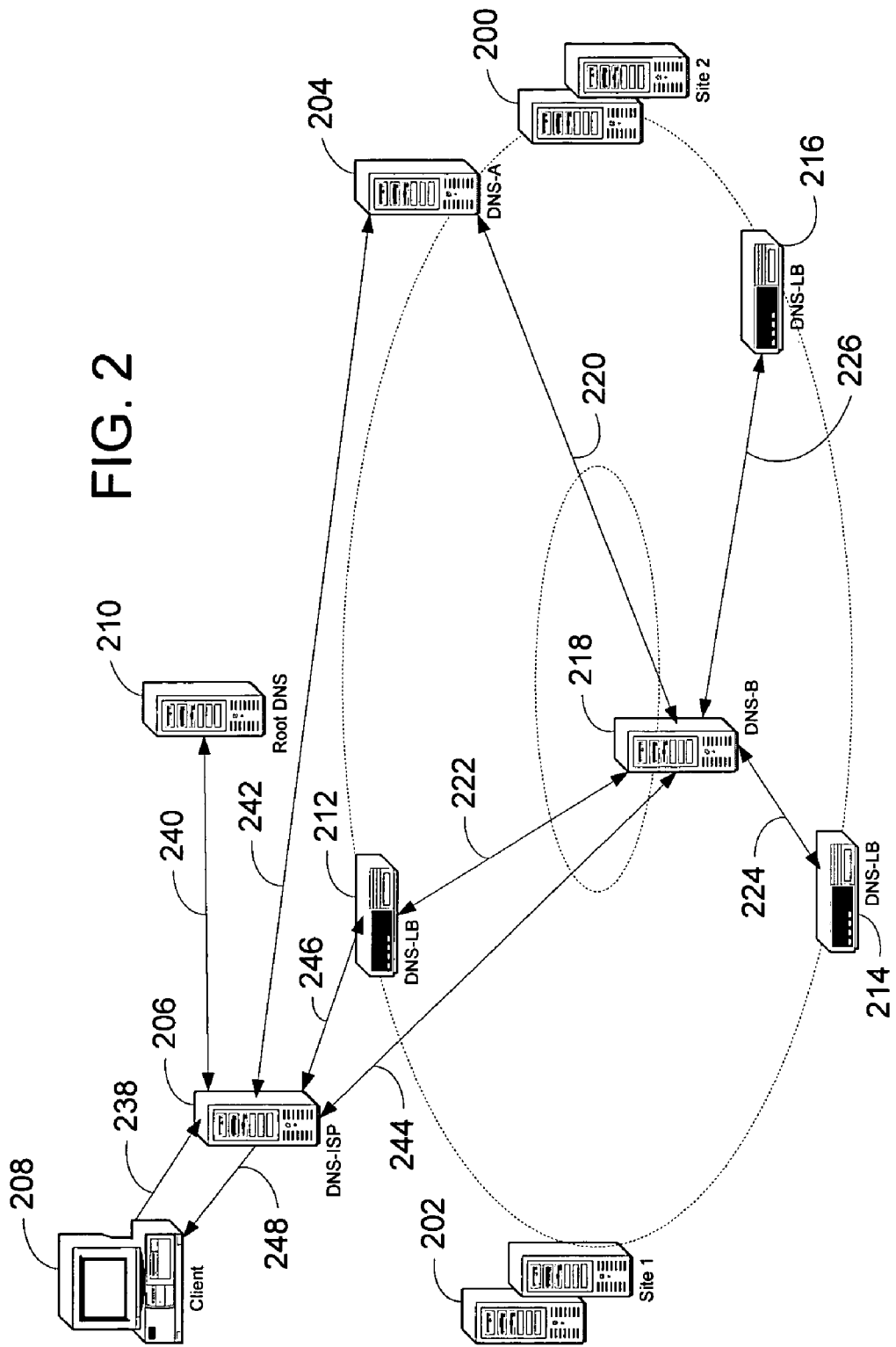
FIG. 2 is a simplified infrastructure diagram illustrating an embodiment of the distributed global load balancing system of the present invention.

The distributed global load balancing (DGLB) system of the instant invention is illustrated in the simplified infrastructure diagram of FIG. 2 to which specific reference is now made. The environment into which the DGLB of the instant invention is utilized includes a business enterprise having multiple server locations 200, 202, etc. positioned at globally-dispersed locations to host the content of the enterprise's Web site. While only two separate sites 200, 202, are illustrated in FIG. 2, one skilled in the art will recognize that additional server sites may be included as determined by an enterprise's client base and performance criteria it wishes to achieve. There also exists an authoritative domain name server (DNS-A) 204 that is capable of providing the IP address information for the enterprise's server sites 200, 202 upon inquiry from an Internet service provider's DNS (DNS-ISP) 206 on behalf of a client 208. Also existing in this environment is the root domain name server 210, and possibly intermediate domain name servers (not shown) that, through successive inquiries well known in the art, will eventually refer the DNS-ISP 206 to the DNS-A 204 for the enterprise's Web site sought by the client 208.

The distributed global load balancing system of the instant invention adds to this environment an infrastructure of multiple load balancing domain name servers (DNS-LBs) 212, 214, 216, etc. Each of these DNS-LBs 212, 214, 216, etc. are located in close physical proximity to each Internet service provider's point of presence (POP) to which a client 208 can connect with a local telephone call. In this way, each DNS-LB is in close physical proximity to each client 208 being served by that particular ISP. As will now be apparent, this embodiment of the invention utilizes one DNS-LB per DNS-ISP. If the ISP chooses to service several POPs with one DNS-ISP, an embodiment of the invention will provide one DNS-LB for all those POPs. However, since it is expected that the DNS-ISP would be close to the POPs it is serving, the DNS-LB will also be close to the clients served by these POPs.

These multiple DNS-LBs 212, 214, 216, etc. form the first level of the DNS hierarchy of the instant invention, one that is in close physical proximity to the clients. As will be well appreciated by those skilled in the art, the number of DNS-LBs may number in the tens of hundreds or thousands to cover all client locations throughout the world. These DNS-LBs are preferably clients of the ISP, and will therefore be configured with the address of the ISP's domain name server (DNS-ISP) 206. In this way, the DNS-LBs will be informed of any address change of the ISP's DNS 206 from the ISP.

The second level of the DNS hierarchy provided by the distributed global load balancing system of the instant invention comprises a set of DNS servers (DNS-Bs) 218 deployed on the Internet backbones (Sprint, MCI, AT&T, UUNET, etc.) or on regional providers by agreement with these carriers (Regional backbones, Internet exchange points). These DNS-Bs 218 receive address mapping information from each of the DNS-LBs 212, 214, 216, etc. to associate these load balancing domain name servers with their physically proximate DNS-ISPs 206. These DNS-Bs 218 also receive information from the authoritative domain name servers (DNS-As) 204 for the various enterprises who have chosen to utilize the services provided by the distributed global load balancing system of the instant invention. This information includes the IP addresses of the various globally distributed server sites 200, 202, etc. that host the enterprise's Web site content. These DNS-Bs 218 provide their IP address to the DNS-As 204 so that proper referral may be made to the distributed global load balancing system upon inquiry for the IP address of the one of the enterprise's Web sites.

Having now described the basic infrastructure of the distributed global load balancing system of the instant invention, the operation of the DGLB will be described with continuing reference to FIG. 2. As discussed briefly above, once an enterprise decides to utilize the distributed global load balancing system of the instant invention, that enterprise's Web site IP name to address mapping information is communicated from the authoritative DNS (DNS-A) 204 to the backbone deployed domain name servers (DNS-B) 218, etc. These DNS-Bs 218, etc. also provide the authoritative DNS-A 204 IP address information that the DNS-A may provide in response to a query for IP address information for its Web sites. This communication of information may take place interactively as illustrated by the communication line 220, or may take place off-line as desired. An advantage of providing on-line communication between these DNS servers 218, 204 is that changes in IP address information for an existing customer or for a new customer wanting to have its sites globally load balanced may be communicated without the delays normally associated with off-line updates. Once the backbone deployed domain name servers 218, etc. have the IP address information for the various contracting enterprises' Web sites, this information may be communicated to the numerous first-level load balancing domain name servers (DNS-LB) 212, 214, 216, etc. via communication lines 222, 224, and 226. This information may be multicast to all of the load balancing domain name servers in the first level of the DGLB infrastructure, or it may be unicast to only particular load balancing domain name servers to whom an inquiry is being referred. One skilled in the art will recognize that information provided to DNS-Bs by DNS-As and to DNS-LBs by DNS-Bs can be cached by the respective DNSs until they get an update due to subsequent changes in sites addresses. The load balancer on DNS-LBs will proactively check the health/availability and network latency of the sites periodically, e.g. every few minutes (or other period that is configurable), or upon receiving a query. Communication between DNS-As, DNS-Bs, and DNS-LBs as shown by communication lines 220, 222, 224, 226 can be through a reliable communications protocol such as TCP, or through some other communications protocol as desired.

Once the requisite domain name servers in the first and second level of the DNS hierarchy of the DGLB acquire the IP address information of the contracting enterprise's Web site server locations, the load balancing domain name servers 212, 214, 216, etc. must communicate to the backbone deployed domain name servers 218, etc. mapping information relating their IP address to their physically proximate Internet service provider's domain name server's IP address. By providing such mapping information to the backbone deployed domain name servers 218, etc., these DNS-Bs 218, etc. are capable of properly referring IP address inquiries to the load balancing DNS that is most closely located to the DNS-ISP and therefore the client from whom the IP address request has originated.

This mapping information may be provided from the load balancing domain name servers 212, 214, 216, etc. via the illustrated communication connections 222, 224, 226, etc. As will be recognized from the foregoing description, this mapping information needs to be communicated from each of the physically proximate load balancing domain name servers in the first level of the DNS hierarchy to each of the backbone deployed domain name servers in the second level. Each of these backbone deployed domain name servers 218, etc. will utilize this information to construct and maintain a mapping table such as that illustrated in simplified form in FIG. 3. As may be seen from this simplified mapping table of FIG. 3, the load balancing domain name server's IP address 228 is related to the ISP's domain name server's IP address 230. While FIG. 3 illustrates symbolic representations of the IP addresses of the various load balancing and ISP domain name servers, one skilled in the art will recognize that the actual IP address is utilized to provide the proper mapping for referral of client-originated requests to the proper load balancing domain name server in closest physical proximity thereto.

Figures 3, 4:
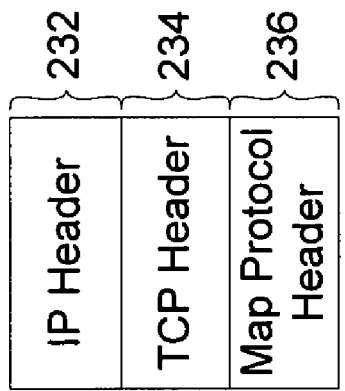
FIG. 3 is a simplified symbolic address table mapping diagram illustrating one aspect of the present invention.
FIG. 4 is a simplified protocol packet illustration utilized in one embodiment of the present invention for communicating address mapping information.

This information may be provided from the load balancing domain name servers 212, 214, 216, etc. to the various backbone deployed domain name servers 218, etc. by transmitting a simple packet of information such as that illustrated in FIG. 4. If this information is to be transmitted utilizing TCP/IP, the packet may include the IP header 232 that contains the source address of the load balancing domain name server and the destination address of the backbone deployed domain name server. In the TCP header section 234 of this exemplary packet, the source port of the load balancing DNS and the destination port of the backbone deployed DNS may be included. Finally, this exemplary packet includes a map protocol header 236 that includes the IP address of the load balancing DNS and the IP address of the ISP's domain name server associated with that particular load balancing domain name server.

Returning again to the infrastructure diagram of FIG. 2, the method of providing global load balancing across multiple, globally dispersed server locations that host an enterprise's Web site information will now be described. Upon initial inquiry 238 from a client 208 for the IP address of a particular Web site address, e.g. www.foobar.com, that client's ISP domain name server 206 checks to determine whether it can resolve the IP address itself. If the DNS-ISP 206 cannot resolve the IP address, it queries 240 the root server 210 for the IP address. The root DNS 210 will then refer the DNS-ISP 206 (possibly through one or more referrals) to the foobar enterprise's DNS that is authoritative for foobar.com (DNS-A) 204. The DNS-ISP 206 will then query 242 the DNS-A 204 for the IP address for foobar.com. Instead of returning the IP address, DNS-A 204 will again refer the DNS-ISP 206 to the DNS-B 218 through a delegation record. Once this referral is received, the DNS-ISP 206 will query 244 the DNS-B 218 for the IP address for foobar.com. Again, instead of returning the IP address for foobar.com to the DNS-ISP 206, the DNS-B 218 will refer the DNS-ISP 206 to a load balancing domain name server in accordance with the mapping table stored therein (see FIG. 3). In the illustrated example, this referral will provide the IP address for the DNS-LB 212. The DNS-ISP 206 will then query 246 the DNS-LB 212 for the IP address for foobar.com. This is done through the DNS CNAME mechanism. That is, DNS-B 218 maps www-.foobar.com to <anylabel>.www.foobar.com through CNAME RR type. It, therefore, redirects (refers) the DNS-ISP 206 to the closest DNS-LB 212 for <anylabel>.www.foobar.com.

The DNS-LB 212 knows which foobar.com site of the several that exist is most well equipped at that particular time to handle the request from that client 208 location. This information is acquired by periodically checking the response time of the sites by performing HTTP operations against it. The load balancing domain name servers employ various characteristics and criteria to determine this information, including response time, to determine which of the several available sites should service the client's request from that physical location. The DNS-LB 212 then returns the IP address for the selected site to the DNS-ISP 206. The DNS-ISP 206 caches that request or a time-to-live (TTL) that is returned with the query response from the DNS-LB 212. The DNS-ISP 206 then returns 248 this address to the client 208. The client 208 is then able to direct its traffic to the particular server site that has been determined to provide it with the best operating characteristics by the DNS-LB 212 located in close physical proximity to it.

In this way, the client 208 is directed to a particular server site that will provide it the lowest network latency (enhanced performance), that results in the lowest cost for the content delivery, that is in the closest physical proximity, or that is a combination of any or all of the above as determined by the enterprise policy. These performance measurements may utilize well known mechanisms including the downloading of web pages, determining the number of resets and abnormal terminations, and other various known mechanisms available in the art. However, unlike current systems that utilize these mechanisms, the infrastructure provided by the DGLB of the instant invention allows these performance measures to be conducted at physical locations in close proximity to the individual clients, thereby providing the most accurate measure of performance as will be seen by that particular client from his physical location.

Since, as described above, the referral process happens every TTL, it does not unduly burden the IP address resolution to add two more domain name servers (DNS-B and DNS-LB) to the referral chain. The referral to the backbone deployed domain name server has a long TTL, such as, for example, one day, while the referral to the DNS-LB has a shorter TTL, such as, for example, one hour. The actual IP address returned by the DNS-LB has a very short TTL, such as 5 minutes, so that subsequent client requests will be referred to a particular server site that is currently providing the optimum performance. Through this mechanism, the ISP is totally oblivious to the presence of the DNS-LBs. The system of the invention refers queries for load balanced sites to DNS-LB through the normal DNS referral mechanism to resolve an IP address, which allows the DNS-LB to gain control of how the request is answered.

While the embodiment of the infrastructure of the DGLB of the instant invention shown in FIG. 2 illustrates separate DNS-ISP and DNS-LB components, one skilled in the art will recognize that the functionality provided by these two components may be combined into a single DNS-ISP (DNS-ISP-LB). As such, the DNS-ISP-LB would become authoritative for the Web sites who have contracted for the global load balancing from the client location through the system of the instant invention. DNS-ISP-LB would receive the information concerning the various IP addresses for the particular Web sites from the DNS-Bs initially, or as an inquiry is received from a client for that information as discussed above for the non-combined case.

For the DNS-ISP-LB case (where DNS-ISP and DNS-LB are combined) it is possible for the DNS-ISP-LB to serve multiple POPs that are not close to the DNS-ISP-LB's location. To allow the DNS-ISP-LB to perform metrics from a location closer to the POPs than its own location, the DNS-ISP-LB can utilize Measurement Service Agents (MService) located close to the POPs (there can be one MService per POP or for a set of POPs that are close to it). The performance metrics can be communicated to the DNS-ISP-LB (or retrieved by the DNS-ISP-LB) by each MService periodically, e.g. every 5 minutes (or other configurable period), or when the DNS-ISP-LB receives a query.

In the embodiment where the metrics are communicated/ retrieved periodically, the DNS-ISP-LB will use the most recently received performance metrics from the MService that is close to the client's POP to determine which site's address to return to the client's address query. The DNS-ISP-LB determines the closest MService to the client's POP by matching the addresses of the MServices against that of the client. Since each MService will be a client of the POP, its address will be from the same address prefix as the other clients of the same POP, allowing for a match. One skilled in the art will recognize that other matching mechanisms may be used as appropriate. For example, the DNS-ISP-LB could maintain a map of client IP prefixes from the various POPs and the addresses of the MService agent for those prefixes or POPs. This mapping table would be similar to the table maintained by DNS-B discussed herein.

As a further alternative embodiment, for the non-combined case, the DNS-LBs could send the Web site response information to the DNS-Bs so that they may directly respond to an inquiry from a particular client with the proper Web site location that will provide that client the best performance from his physical location. The information provided from the DNS-LBs could be a listing from best to worst of the server site IP addresses, or only the current best IP address as desired. In this embodiment, the DNS-LBs really are not performing a DNS service, but instead are monitoring the performance of the contracted server sites from locations in close proximity to the clients at that physical locale. It is noted that while best performance will be achieved by providing a DNS-LB at each ISP POP, acceptable performance may well be achieved by deploying fewer DNS-LBs providing more regional than local performance measure.

As a further alternative embodiment, the DNS-LBs could also perform the function of a caching engine. In this embodiment, the DNS-Bs respond to the name query by returning the IP address of the DNS-LB corresponding to the DNS-ISP that sent it the request (through the referral process) as the address for www.foobar.com. Alternatively, the DNS-B refers the DNS-ISP t the DNS-LB and the DNS-LB returns its own address instead of the address of the best performing site. The client 208 then sends its HTTP request to the DNS-LB. When that DNS-LB gets the HTTP request, it acts as a proxy cache for the request. Since the DNS-LB includes the ability to measure the performance from that physical location to the various server sites, it retrieves the cacheable content from either the closest or best performing foobar site or another closer proxy server that has the content, which is providing the best network latency. In the combined case (DNS-ISP-LB), the DNS-ISP-LB would return the address of the closest MService that is acting as a cache.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A system for performing client-centric load balancing of multiple globally-dispersed servers, the servers being accessed by clients connecting through an ISP having a domain name server (DNS-ISP), the servers further having an authoritative domain name server (DNS-A) associated therewith and an external domain name server (DNS-B), the system comprising: one of a plurality of load balancing domain name servers (DNS-LBs) deployed in a physical proximity from which the network latency of the clients to the multiple globally-dispersed servers is measured, each DNS-LB comprising a processor and memory, the DNS-LBs having stored therein IP address information of the multiple globally-dispersed servers to be load balanced, the DNS-LBs each sending mapping information to the DNS-B relating the DNS-LB's IP address to an IP address of the DNS-ISP to which the DNS-LB is in a physical proximity from which the network latency of the clients to the globally-dispersed servers is measured, the DNS-LBs determining performance characteristics of each of the multiple globally-dispersed servers, a DNS-LB receiving DNS lookup requests sent from the DNS-LB's respective physically-proximate clients to the DNS- LB's corresponding DNS-ISP, the DNS lookup requests comprising respective hostnames of some of the globally-dispersed servers and having been directed to the DNS-LB by the DNS-B using the IP address of the DNS-LB in the mapping information at the DNS-B, the DNS-LB using the DNS-LB's measurements of network latency from the clients to the globally-dispersed servers to resolve the DNS lookup requests to respective IP addresses of the some of the globally-dispersed servers, where DNS lookup request's hostname can be resolved to multiple of the IP addresses and the DNS-LB returns to the client the IP address that has lower network latency.

2. The system of claim 1, wherein the DNS-B stores the mapping information for the plurality of DNS-LBs to forward IP address queries to one of the DNS-LBs closest to the DNS-ISP from which the IP address query originated, and wherein the DNS-LB closest to the DNS-ISP returns the IP address to the DNS-ISP of the server having the best performance characteristics.

3. The system of claim 1, wherein the DNS-B stores the mapping information for the plurality of DNS-LBs to forward IP address queries to one of the DNS-LBs closest to the DNS-ISP from which the IP address query originated, and wherein the DNS-LB closest to the DNS-ISP returns the IP address of the DNS-LB to the DNS-ISP.

4. The system of claim 1, wherein the DNS-B provides its IP address information to the DNS-A to enable the DNS-A to forward IP address queries to the DNS-B.

5. The system of claim 4, wherein the DNS-B receives IP address information from the DNS-A for the servers to be load balanced.

6. The system of claim 1, wherein the DNS-LB is a client of the DNS-ISP.

7. The system of claim 1, further comprising a DNS-B deployed on each Internet backbone, and wherein each DNS-B contains the mapping information for all of the DNS-LBs stored therein.

8. The system of claim 1, wherein the DNS-LB transmits updated mapping information upon a change of an IP address of the DNS-ISP.

9. The system of claim 1, wherein each of the DNS-LBs transmit performance information of the servers to the DNS-B, and wherein the DNS-B utilizes the mapping information to determine the proper DNS-LB performance information to utilize to select the IP address of the server having the best performance characteristics to return to the DNS-ISP from which an IP address query originated.

10. A method of performing client-centric load balancing of multiple globally-dispersed servers, the servers being accessed by clients connecting through an ISP having a domain name server (DNS-ISP), the servers further having an authoritative domain name server (DNS-A) associated therewith, the method comprising the steps of:
  receiving IP address information from the DNS-A for the servers to be load balanced;
  providing the IP address information to a plurality of load balancing domain name servers (DNS-LB);
  receiving mapping information associating DNS-ISP IP address information to IP address information of a DNS-LB located in a physical proximity from which the network latency from the clients to the globally-dispersed servers is measured by the DNS-LB from a location physically proximate to the ISP's point of presence; and
  referring DNS address inquiries from a DNS-ISP to a physically proximate DNS-LB in accordance with the mapping information, a DNS address inquiry comprising a hostname corresponding to multiple of the globally-dispersed servers, and wherein the DNS-LB selects one of the multiple servers according to the DNS-LB's determining of client-to-server latency performance and answers the DNS address inquiry by returning the IP address of the selected server.

11. A method of performing client-centric load balancing of multiple globally-dispersed servers, the servers being accessed by clients connecting through an ISP having a domain name server (DNS-ISP), the servers further having an authoritative domain name server (DNS-A) associated therewith, the method comprising the steps of:
  obtaining, by a load balancing domain name server (DNS-LB), IP address information for a DNS-ISP, the DNS-LB located in a physical proximity from which the network latency of the clients may be measured;
  providing a mapping of an IP address of the DNS-LB to the IP address information of the DNS-ISP to an external domain name server;
  receiving IP address information for the servers;
  monitoring performance of the servers at the received IP addresses by the DNS-LB transmitting communications to the IP addresses of the servers;
  receiving at the DNS-LB a DNS name query that was sent from one of the clients to the DNS-ISP, the DNS name query querying for an IP address of a hostname that corresponds to multiple of the servers; and
  providing at least one IP address for a server in response to the DNS name query by selecting the server, based on the monitoring step, from among the multiple servers that correspond to the hostname, and by returning the IP address for the selected server.

12. The method of claim 11, further comprising the steps of:
  detecting a change in the DNS-ISP IP address; and
  updating the mapping of the IP address of the DNS-LB to the IP address information of the DNS-ISP to the external domain name server.

13. The method of claim 11, further comprising the steps of receiving selection criteria for the selection of an IP address;
  receiving a name query from the DNS-ISP; and
  wherein the step of providing at least one IP address for a server in response to a name query selected based on the monitoring step further comprises the step of providing at least one IP address for a server in response to a name query selected based on the monitoring step and on the selection criteria.

14. A method of performing client-centric load balancing of multiple globally-dispersed content servers for handling content requests from clients, the servers being accessed by clients connecting through an Internet service provider's (ISP's) point of presence (POP), the ISP having a domain name server (DNS-ISP), the servers further having an authoritative domain name server (DNS-A) associated therewith containing information regarding the IP addresses of the servers, the method comprising the steps of:
  deploying a plurality of load balancing domain name servers (DNS-LBs) in a physical proximity from which the network latency of the clients connecting to the ISP POPs may be measured;
  communicating IP address information for a plurality of second level domain name servers (DNS-Bs) to the DNS-As to enable the DNS-As to refer name queries to the DNS-Bs;
  providing, by the DNS-LBs to the DNS-B, mapping information associating IP addresses of the DNS-LBs to IP addresses of their corresponding DNS-ISPs to enable the DNS-B to refer name queries from DNS-ISPs to DNS-LBs; and communicating IP address information of the servers to the DNS-LBs;

monitoring, by the DNS-LBs, performance of the servers;

receiving at a DNS-LB a DNS name query that was sent from one of the clients to the DNS-ISP, the DNS name query querying for an IP address of a hostname that corresponds to multiple of the servers, the DNS name query having been sent from the client in response to the client starting a service request needing an IP address for the hostname; and providing, by the DNS-LB, in response to the DNS name query from the DNS-ISP, the IP address of a server by selecting the IP address from among the IP addresses of the multiple of the servers based on the step of monitoring.

15. The method as recited in claim 14, wherein DNS-LB is situated closest to the DNS-ISP among the DNS-LBs.

16. A method comprising:

receiving at a load-balancing domain name service server (DNS-LB) a DNS lookup request received by and redirected from a domain name service server of an internet service provider (DNS-ISP), the request having been sent by a client of the DNS-ISP, the request containing a hostname corresponding to a plurality of IP addresses of servers serving content, where the request was forwarded by the DNS-ISP when the DNS-ISP: determined that an IP address for the hostname was not cached at the DNS-ISP and obtained the IP address of the DNS-LB by issuing a DNS query for the hostname, the IP address of the DNS-LB having been sent to the DNS-ISP based on a mapping between the IP address of the DNS-LB and the DNS-ISP;

measuring network latency from the DNS-LB to the servers that correspond to the hostname in the request by repeatedly sending communications from the DNS-LB to the servers;

in response to receiving the redirected DNS lookup request of the client at the DNS-LB, selecting an IP address of one of the servers that correspond to the hostname, where the IP address is selected from among the servers based on the measuring of network latency to the servers; and returning to the client the selected IP address.

17. A method performed by a DNS server that provides DNS service for a plurality of clients, the method comprising:

receiving from a client a DNS lookup request requesting an IP address for a server having a hostname specified by the request;

in response to receiving the client DNS lookup request, determining that an IP address for the requested hostname is unavailable on the DNS server and in response issuing a DNS query for the hostname;

in response to issuing the DNS query for the hostname by the DNS server, receiving a referral to an authoritative DNS server (DNS-A) that corresponds to the hostname, the referral providing an IP address of a domain name service load-balancing server (DNS-LB) and causing the DNS server to query the DNS-LB for an IP address of the hostname in the client request, the referral having been transmitted based on information associating the DNS-LB with the DNS server;

in response to querying the DNS-LB, receiving an IP address from the DNS-LB, where the IP address corresponding to the hostname was selected by the DNS-LB based on response times of requests sent from the DNS-LB to IP addresses that correspond to the hostname; and sending the IP address received from the DNS-LB to the client that sent the lookup request for the web server having the hostname specified by the request.

* * * * *

UNITED STATES PATENT AND TRADEMARK OFFICE
CERTIFICATE OF CORRECTION

PATENT NO. : 7,653,700 B1  Page 1 of 1
APPLICATION NO. : 09/714406
DATED : January 26, 2010
INVENTOR(S) : Pradeep Bahl et al.

It is certified that error appears in the above-identified patent and that said Letters Patent is hereby corrected as shown below:

Title page, item (75), under "Inventors" column 1, lines 2-3, delete "Bernard D. Aboda," and insert -- Bernard D. Aboba, --, therefor.

Signed and Sealed this
Eighth Day of February, 2011

David J. Kappos
*Director of the United States Patent and Trademark Office*